United States Patent
Goodno

(10) Patent No.: US 12,327,977 B2
(45) Date of Patent: Jun. 10, 2025

(54) FIBER LASER WITH DOUBLE-PASSED PUMP ARCHITECTURE

(71) Applicant: NORTHROP GRUMMAN SYSTEMS CORPORATION, Falls Church, VA (US)

(72) Inventor: Gregory Goodno, Redondo Beach, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 854 days.

(21) Appl. No.: 17/643,261

(22) Filed: Dec. 8, 2021

(65) Prior Publication Data
US 2023/0178955 A1 Jun. 8, 2023

(51) Int. Cl.
H01S 3/094 (2006.01)
H01S 3/06 (2006.01)
H01S 3/067 (2006.01)
H01S 3/0941 (2006.01)

(52) U.S. Cl.
CPC ...... *H01S 3/094015* (2013.01); *H01S 3/0621* (2013.01); *H01S 3/0623* (2013.01); *H01S 3/06733* (2013.01); *H01S 3/06745* (2013.01); *H01S 3/094007* (2013.01); *H01S 3/0941* (2013.01)

(58) Field of Classification Search
None
See application file for complete search history.

(56) References Cited

U.S. PATENT DOCUMENTS

| | | | |
|---|---|---|---|
| 6,347,100 B1 * | 2/2002 | Sanders | H01S 3/067 372/5 |
| 10,666,010 B1 * | 5/2020 | Näppi | H01S 3/06708 |
| 2006/0209909 A1 * | 9/2006 | Ota | G02B 6/4206 372/6 |
| 2013/0100972 A1 * | 4/2013 | Creeden | H01S 3/06733 372/9 |

OTHER PUBLICATIONS

Jeong et al. "Simple and compact, all-fibre retro-reflector for cladding-pumped fibre lasers", Electronics Letters, Jan. 5, 2006 vol. 42 No. 1. (Year: 2006).*

* cited by examiner

*Primary Examiner* — Eric L Bolda
(74) *Attorney, Agent, or Firm* — John A. Miller; Shumaker, Loop & Kendrick, LLP

(57) ABSTRACT

A fiber laser amplifier system including a first dual-clad delivery fiber receiving a signal beam and a pump beam, a doped amplifying fiber coupled to the first delivery fiber and receiving the signal beam and the pump beam, and amplifying the signal beam using the pump beam, and a second dual-clad delivery fiber coupled to the amplifying fiber and receiving the amplified signal beam and the pump beam. The system also includes an endcap having an input facet and an output facet. The input facet is coupled to the second delivery fiber and receives the amplified signal beam and the pump beam, and the output facet is configured to pass the amplified signal beam and reflect the pump beam back onto the second delivery fiber to be directed back to the doped amplifying fiber.

20 Claims, 3 Drawing Sheets

FIBER LASER WITH DOUBLE-PASSED PUMP ARCHITECTURE

BACKGROUND

Field

This disclosure relates generally to a fiber laser pumping architecture that reduces the impact of nonlinear and thermal impairments and, more particularly, to a fiber laser pumping architecture that includes a dichroic endcap that double-passes the pump light so as to reduce the impact of nonlinear and thermal impairments.

Discussion

High power laser amplifiers have many applications including industrial, commercial, military, etc. Designers of laser amplifiers are continuously investigating ways to increase the power of the laser amplifier for these and other applications. One known type of laser amplifier is a fiber laser amplifier that employs a doped fiber, such as a ytterbium (Yb) doped fiber or a thulium (Tm) doped fiber, that receives a seed beam and a pump beam that amplifies the seed beam and generates the high power laser beam, where the fiber has an active core diameter of about 10-20 μm or larger.

Directed energy (DE) systems that direct a high energy optical beam to a target are rapidly being realized in real-world operational environments. Reliable, robust and efficient beam delivery of individual multi-kW class lasers and high energy and peak power pulsed illuminators to remote beam directors and combiners are key driving elements for DE systems. Fiber laser amplifiers have proven to be desirable as energy sources for DE systems because of their high efficiency, high power scalability and excellent beam quality. Fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot, where focusing the combined beam to a small spot at a long distance (far-field) defines the quality of the beam.

In one known multiple fiber laser amplifier design referred to as coherent beam combining (CBC), a master oscillator (MO) generates a seed beam that is split into a plurality of split seed beams each having a common wavelength, where each seed beam is amplified. The amplified seed beams are then directed to a diffractive optical element (DOE), or other optical system, that combines the coherent amplified beams into a single output beam. The DOE has a periodic structure formed into the element so that when the individual amplified beams each having a slightly different angular direction are redirected by the periodic structure all of the beams diffract from the DOE in the same direction.

In another known multiple fiber laser amplifier design referred to as spectral beam combining (SBC), a plurality of master oscillators (MOs) generate a plurality of seed beams at a plurality of different wavelengths, where each seed beam is amplified. The amplified seed beams are then directed to a diffraction grating, or other wavelength-selective element, that combines the different wavelength fiber beams into a single combined output beam. The diffraction grating has a periodic structure formed into the grating so that when the individual amplified beams each having a slightly different wavelength and angular direction are redirected by the periodic structure all of the beams diffract from the diffraction grating in the same direction.

For a typical known fiber amplifier stage, the fiber gain medium is formed as a double-clad fiber with typical cross-section diameters on the order of 20 um for a Yb-doped signal core, 400 um for the pump cladding and 550 um for the outer acrylate coating. The core numerical aperture (NA) is selected to enable a single transverse mode operation to ensure good beam quality for the signal light, typically NA~0.06. The cladding NA is provided as high as possible to enable coupling of low-brightness diode pump light, typically NA ~0.46. The desired low power seed beam light is injected in the fiber core, and diode pump light is co-injected into the cladding at the same end of the fiber. As the pump light propagates down the fiber it is absorbed as it crosses the core, causing the seed beam in the core to be amplified to the multi-kW level at the output. Typically, the fiber length is chosen sufficiently long to absorb 95% or more of the diode pump light.

For a packaged narrow-linewidth multi-kW fiber laser amplifier, pump and seed beam light is typically not coupled through free space, but rather is injected using specialized all-fiber components in a multi-stage chain of amplifiers. In one specific design, the seed beam is often amplified to the 10 W class in a multistage pre-amplifier before injection into the core of a dual-clad gain fiber. Diode pump light is injected into the cladding of the gain fiber using a tapered fiber bundle pump-signal combiner (PSC). After amplification, the output end the gain fiber is spliced to a passive delivery fiber. Residual pump light is stripped from the cladding using a cladding light stripper (CLS) where the acrylate coating is window-stripped, and the exposed cladding glass surface is either roughened or contacted to an index-matched adhesive to out-couple residual pump light. A wedged, antireflection (AR) coated endcap is spliced to the output end of the delivery fiber to allow the fiber mode to expand to avoid damaging the output facet, and suppress back-reflections of signal light. Typically, the amplifier is operated with a saturated gain in excess of 20 dB, and a return loss of −60 dB from the endcap is required to avoid instability or unwanted power extraction in the return direction.

Power-scaling of narrow-linewidth Yb doped fiber amplifiers is currently limited by two separate nonlinear optical impairments, specifically stimulated Brillouin scattering (SBS) and self-phase modulation (SPM), where the primary nonlinear impairment is SBS. SBS is a nonlinear effect in which the laser electric field creates a phase grating in the fiber core by electrostriction that reflects some fraction of the forward-propagating beam. If the effective reflectivity of the grating becomes too large, the output power from the fiber amplifier will decrease, with the lost power being reflected backwards towards upstream, low-power components, eventually causing catastrophic damage. Because the threshold for SBS is inversely proportional to the spectral brightness (~power/linewidth), SBS limits the powers available from single-frequency fiber lasers to several hundred watts. To increase the threshold power for SBS, it is common practice to broaden the fiber laser input seed spectrum to the multi-GHz domain using phase modulation, or equivalently frequency modulation (FM). This reduces the optical coherence length and therefore reduces SBS gain. As the power of Yb doped fiber amplifiers increase to the multi-kW level, or as delivery fiber lengths increase, broader FM linewidths are needed to suppress SBS. Typically the linewidth increases approximately linearly with power on the order of ~10-20 GHz/KW for Yb doped fiber amplifiers. Reducing the SBS-limited linewidth, i.e., increasing the SBS-limited fiber spectral brightness, would enable beam-combined fiber laser system scaling to higher powers.

The optical impairment SPM is parameterized by the B-integral, i.e., the non-linear phase shift, and can degrade beam coherence by converting low levels of uncontrolled amplitude modulation (AM) into phase noise. This non-linear effect can limit the efficiency of CBC or the beam quality of SBC, hence reducing the performance of the fiber laser system. Specifically, there is a loss of spectral brightness or a loss of optical coherence. To avoid or reduce these effects, it is generally desirable to limit the amount of AM, also known as relative intensity noise (RIN), propagating in the seed beam that seeds the fiber amplifier. Techniques that broaden the spectrum of the seed beam to provide frequency modulation without providing amplitude modulation can be implemented in a fiber amplifier, where if the seed beam is only frequency modulated, then the Kerr non-linearities that drive SPM will not create problems, i.e., no time dependent non-linear phase shifts of the seed beam. However, if AM is imposed, either deliberately or inadvertently by FM-to-AM conversion, on the seed beam, then SPM can cause nonlinear spectral broadening of the beam emitted from the fiber amplifier, which could reduce beam quality during SBC.

These optical impairments typically limit the spectral brightness of the output beam, i.e., the power per unit of optical linewidth, or KW/GHz. These optical impairments grow in severity as the fiber powers increase and as the fiber lengths increase. As fiber powers increase to the multi-kW level, or as delivery fiber lengths increase, broader FM linewidths are needed to suppress SBS. For a co-pumped fiber amplifier, the impairment magnitude typical grows as the integral of signal power over the fiber length (colloquially known as the effective power-length product). Hence, one path to scale fiber lasers to higher power while maintaining narrow spectral linewidth is to reduce nonlinear optical impairments by decreasing the effective length of the fiber.

Although shorter fiber lengths are well known to be advantageous to reduce nonlinear optical impairments and enable spectral brightness scaling, other engineering considerations impose limits on practical minimum fiber lengths in the amplifier. For example, one engineering constraint is the need to absorb most of the pump light to ensure high optical-to-optical conversion efficiency. Yb-doped fibers suitable for high power amplifiers typically have cladding pump absorption coefficients of ~1-1.5 dB/m. This requires gain fiber lengths on the order of 10 m to absorb >95%, or 13 dB, of the total pump light. Another engineering constraint is the need to minimize generation of waste heat per unit fiber length. If the length of a fiber amplifier emitting a fixed power level is cut in half while maintaining the same total pump absorption (e.g., by turning the pump wavelength to increase its effective absorption characteristic), then the waste heat per unit length will double, which causes the fiber temperature to increase. When the fiber gets too hot, its acrylate coating may burn, leading to catastrophic failure. Waste heat is particularly limiting for Tm-doped fibers emitting in the 2-um band, since their pump absorption coefficient (~6 dB/m) is typically ~4-5× higher and their quantum defect (waste heat fraction, ~35%) is 3× higher than similar geometry Yb-doped fibers emitting at 1 um. Hence, co-pumped fiber amplifier lengths are driven by a tradeoff to balance the competing design imperatives of suppressing SBS/SPM (shorter fibers) and maintaining high absorption efficiency and low temperature (longer fibers). There is a need for fiber amplifier pump architectures that increase this tradeoff space to scale to higher spectral brightness.

One well known fiber amplifier architecture that enables higher performance by mitigating SBS and SPM is to switch the direction of pump light from co-propagating with the seed beam to counter-propagating with the seed beam. A pump-signal combiner is often placed at the high power output end of the amplifier, and pump cladding light is launched backwards in the direction opposite the seed beam. This architecture has the benefit of redistributing laser gain in the amplifier toward the output end, which reduces the effective power-length product, i.e., the integral of power over the fiber length. However, the counter-pumped architecture also has several well-known drawbacks that have prevented its wide adoption in fiber laser amplifiers typically used for beam combining.

Counter-pumping results in a very high peak heat load near the output end of the fiber, where both the pump and seed beam light are at their maximum intensity and therefore laser extraction is highly saturated, which can cause thermal damage to the fiber. The PSC at the output imposes additional loss to the high power seed beam in comparison to co-pumping. This is due to the additional splice required, and due to the insertion loss of the tapered fiber bundle (TFB) combiner itself. The splice between the gain fiber and the PSC is difficult, since its performance must be simultaneously optimized for both low pump loss (usually requiring a "hot" splice to fully melt the outer glass claddings into a smooth transition), and for low signal loss (usually requiring a "cold" splice to prevent material diffusion out of the core). This generally results in higher losses than if pump and seed beam splices can be optimized separately. The PSC must be able to handle and properly sink uncontrolled lost signal power from the splice and from the internal TFB structure. This is particularly difficult for Tm-doped fibers, where the scattered 2 um seed beam light is absorbed by most fiber acrylate coatings and can cause them to burn. The PSC imposes significant (typically 0.5-1 m) additional fiber length at the amplifier output, which can partially offset the reduction in nonlinear length afforded by counter-pumping in the first place.

Both co-pumping and counter-pumping can be implemented simultaneously through bi-directional pumping or bi-pumping. This bi-pumped approach does not provide as much of a reduction of the effective power-length product as counter-pumping alone, but it is still an improvement over co-pumping. By splitting the pump power between two ends of the fiber, thermal loads can be split more evenly than by co- or counter-pumping alone. However, bi-pumping still suffers from the integration and power handling challenges of having a PSC at the high power output end of the amplifier. Hence, there is a need for an improved fiber pumping architecture that reduces nonlinear impairments without sacrificing pumping efficiency, increasing fiber temperatures, or suffering the performance and integration issues due to a PSC at the output.

DETAILED DESCRIPTION OF THE EMBODIMENTS

The following discussion of the embodiments of the disclosure directed to a fiber laser pumping architecture that includes a dichroic endcap that double-passes the pump light so as to reduce the impact of nonlinear and thermal impairments is merely exemplary in nature, and is in no way intended to limit the disclosure or its applications or uses.

Figure 1:
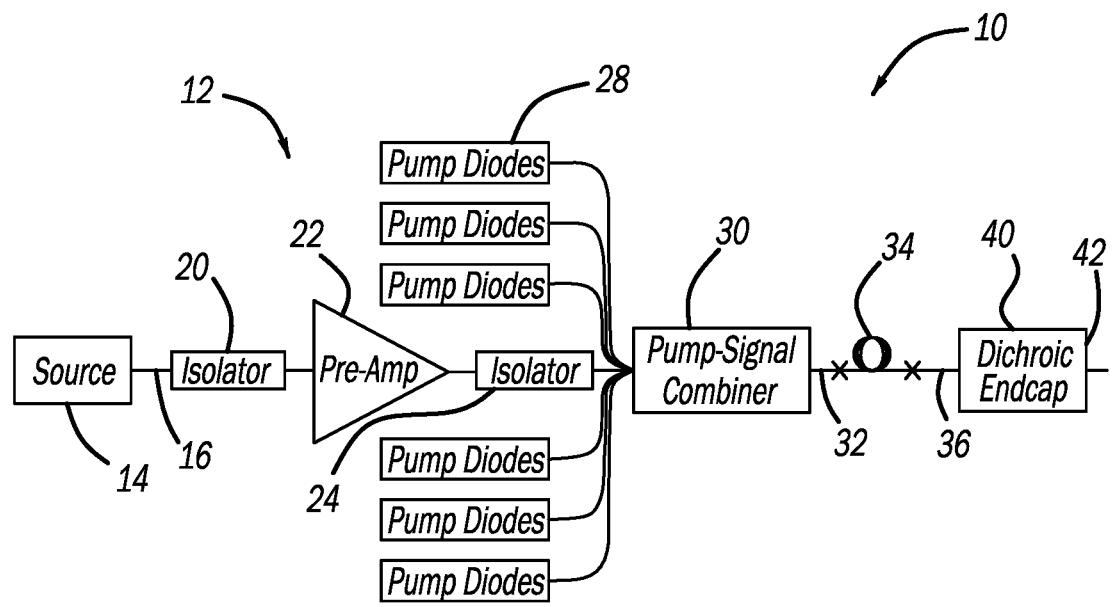
FIG. 1 is a schematic block diagram of a fiber laser amplifier system including a double-pass pump architecture having a dichroic endcap.

FIG. 1 is a simplified block diagram of a fiber laser amplifier system 10 that includes a single amplification channel 12 having a seed or signal beam source 14 that generates a low power signal beam having a center wavelength 1 on a fiber 16. The source 14 may include a master oscillator (MO), such as a single-longitudinal mode distributed feedback (DFB) diode laser oscillator, and a frequency modulator, such as an electro-optical modulator (EOM). The EOM may receive an applied voltage provided by an amplified radio frequency (RF) electrical drive signal from an RF source (not shown) that provides frequency modulation broadening, such as white noise or pseudo-random bit sequence (PRBS), so that the modulated signal beam has a linewidth that is substantially broadened, which suppresses stimulated Brillouin scattering in downstream high power fiber amplifiers. A low power pre-amplifier 22 receives the broadened signal beam, where the pre-amplifier 22 can be a single fiber amplifier or a serial chain of fiber amplifiers, so as to boost the beam power to levels suitable to seed a high power fiber amplifier (typically about 10 W). Optical isolators 20 and 24 on each side of the pre-amplifier 22 allow the signal beam to pass through, but prevent reflected amplified light from returning and entering the source 14, which may otherwise cause damage.

Figure 2:
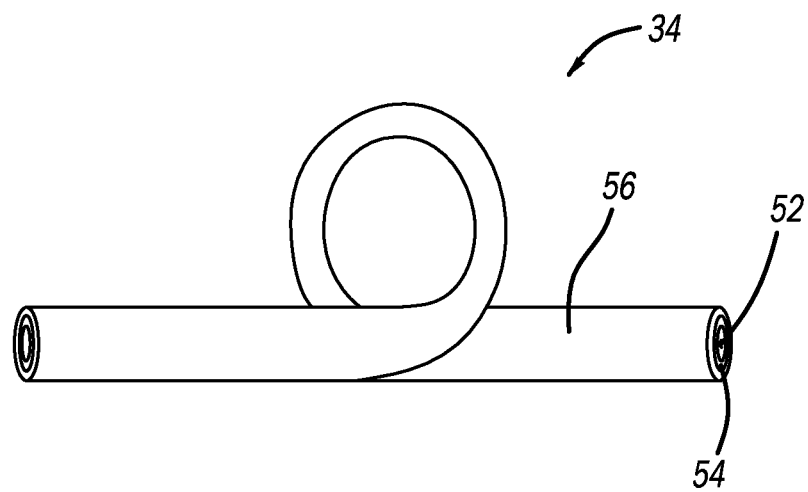
FIG. 2 is an illustration of the gain fiber in the fiber laser amplifier system shown in FIG. 1.

The signal beam along with a plurality of pump beams from pump diodes 28 are combined in a pump-signal combiner 30, such as a suitable tapered fiber bundle, and are sent to a dual-clad delivery fiber 32, such that the pump light propagates in the fiber cladding and the signal light propagates in the fiber core. The dual-clad delivery fiber 32 is spliced to a doped gain fiber 34 that amplifies the signal beam using the pump beams in a co-pumped manner. FIG. 2 is an illustration of the gain fiber 34 depicting a 20 um core 52, a 400 um inner cladding layer 54 and a polymer coating 56. The dual-clad delivery fiber 32 has the same structural elements as the gain fiber 34, except that the core of the delivery fiber 32 is not doped with a laser gain material.

The gain fiber 34 is spliced to a dual-clad delivery fiber 36 that also has the same structural elements as the gain fiber 34, except that the core of the delivery fiber 32 is not doped with a laser gain material. The delivery fiber 36 is coupled to a dichroic endcap 40 that allows for the expansion of the amplified signal beam so as to reduce optical power density when the signal beam reaches the air interface, which might otherwise damage the delivery fiber 36. As will be discussed in detail below, an output end of the endcap 40 is coated with a dichroic and antireflection coating or layer 42 that reflects the pump beam wavelength and passes the signal beam wavelength. The dichroic layer 42 is similar to the known AR coatings that are typically a stack of thin dielectric layers having the desired optical properties for preventing as much of the signal beam as possible from being reflected back into the endcap 40, but the materials and thicknesses of the layer 42 are designed to also reflect the pump beam wavelengths. The reflected pump beam is directed back into the cladding of the dual-clad delivery fiber 36 so that the reflected pump beam provides additional signal beam amplification in the gain fiber 34 in a counter-propagating manner. This effectively doubles the fiber absorption length of the gain fiber 34 and enables a reduction in the peak fiber heat load equivalent to the benefit of bi-directional pumping without the added complexity, performance impact or development cost of counter-pump couplers. Additionally, by shifting laser gain and signal power toward the output end of the gain fiber 34, the effective nonlinear interaction length for double-passing is only 70% that of an equivalent length of co-pumped fiber. When coupled with the two-times reduced heat load, the net benefit of implementing double-pass pumping toward reducing nonlinear impairments is three-times compared with co-pumping.

Figure 3:
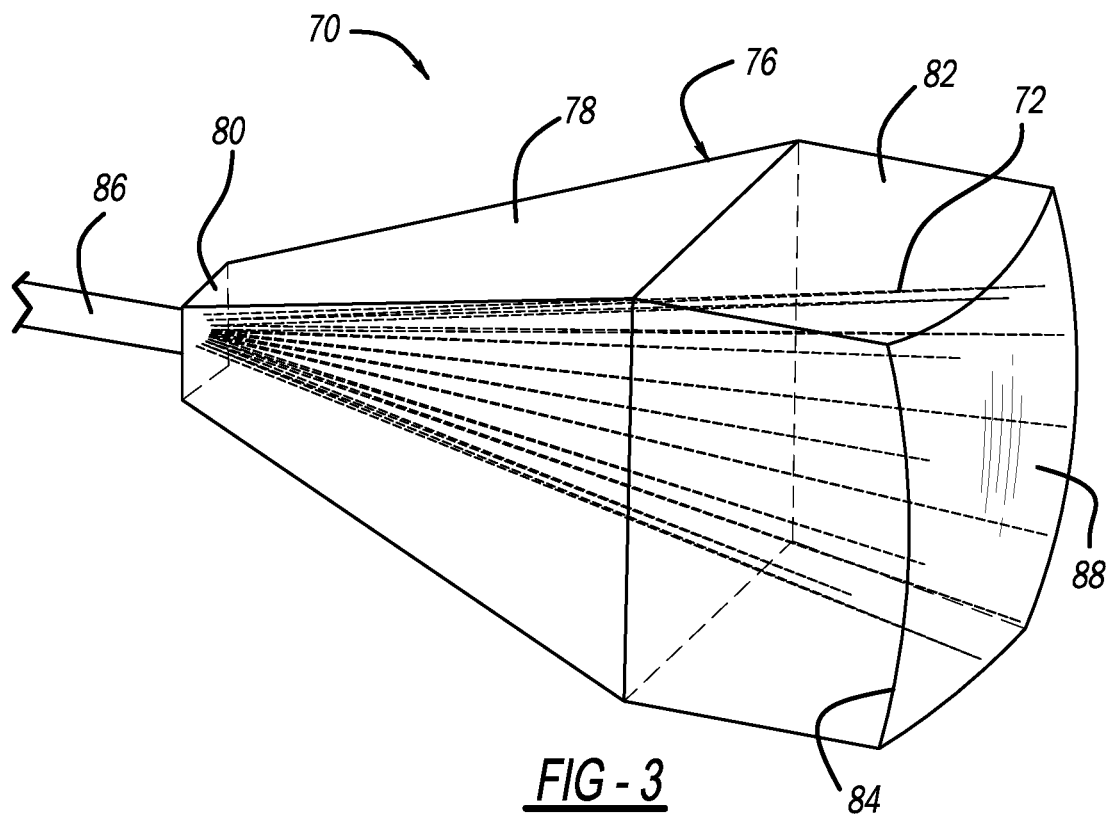
FIG. 3 is an isometric view of a dichroic endcap showing pump beam light.
Figure 4:
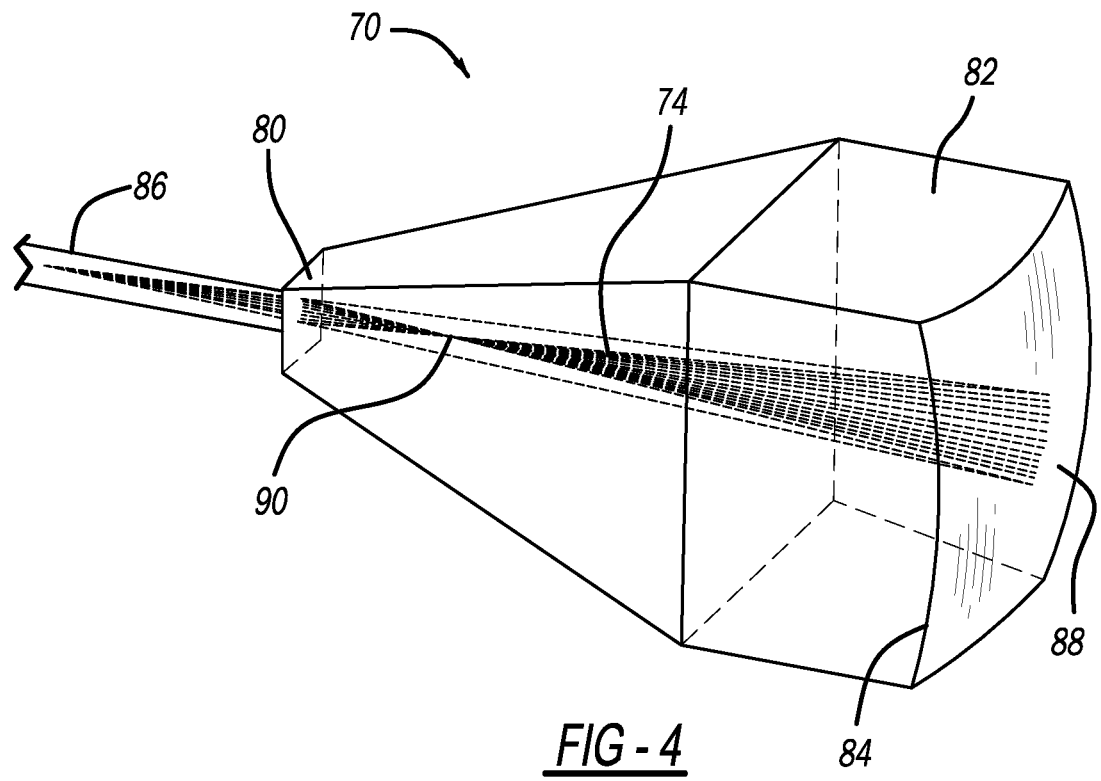
FIG. 4 is an isometric view of the dichroic endcap showing signal beam light.

FIG. 3 is an isometric view of an endcap 70 showing pump light 72 propagating therethrough and FIG. 4 is an isometric view of the endcap 70 showing signal light 74 propagating therethrough, where the pump light 72 diverges more than the signal light 74 because it is of lower quality beam with a higher beam parameter product. The endcap 70 is being shown as one non-limiting example of an endcap that can be used as the endcap 40 in the system 10 in that other configurations of the endcap 40 can be provided consistent with the discussion herein. The endcap 70 includes a glass body 76 having a tapered portion 78 with an entrance facet 80 and a straight portion 82 with a spherical curved exit facet 84. As will be discussed in detail below, a short, for example, a few millimeters, coreless fiber 86 is optionally coupled to the entrance facet 80 at one end and the delivery fiber 36 is spliced to the coreless fiber 86 at its other end, where the coreless fiber 86 has the same structural elements as the gain fiber 34, except it does not have a core. The tapered portion 78 reduces the amount of glass that needs to be heated when the coreless fiber 86 is optically welded to the entrance facet 80 so that the fiber 86 and the entrance facet 80 melt at the same time. A dichroic coating 88 is deposited over the exit facet 84 and is configured so that a large percentage of the pump light 72 is reflected back to the fiber 86 and into the delivery fiber 36 and then into the gain fiber 34 and a large percentage of the signal light 74 passes through the exit facet 84, and thus the coating 88 operates as an AR coating for the signal light 74.

The length of the coreless fiber 86, if used, is not critical, however its maximum length is limited by the divergence of the signal light 74 at the entrance facet 80 if the length is too long. Typically, to avoid significant clipping, the length of the coreless fiber 86 should be less than nD/4*NA, where n is the index of refraction of the fiber glass, D is the diameter of the coreless fiber 86 and NA is the divergence half angle of the signal fiber mode, and where a typical NA for a fiber core diameter of 20 μm and a wavelength of 1 um is 0.035. The assembly process would first involve splicing a long length of the coreless fiber 86 to the cored delivery fiber 36, and then cleaving it to the desired length from the splice joint. The coreless-fiber terminated assembly would then be welded to the endcap 70. Since the pump light 72 travelling within the cladding layer 54 of the dual clad gain fiber 34 and the delivery fiber 36 has a typical NA of ~0.46, the pump light 72 will begin diverging at the weld joint between the delivery fiber 36 and the coreless fiber 86. Hence, for efficient double-passing the pump light 72 must be re-imaged back onto the fiber cladding layer 54. This is achieved by configuring the dichroic endcap 70 with the spherical exit facet 84. The center of curvature of the facet 84 is located at the coreless fiber-to-endcap weld joint, so that the residual cladding pump light 72 is retro-reflected to double-pass both the delivery fiber 36 and the gain fiber 34.

For a perfectly aligned system with as a pump NA=0.46, a fiber cladding diameter of 400 µm and an endcap length of 8 mm with an index n=1.45 (fused silica), about 99.3% of the reflected pump light 72 is re-imaged into the cladding layer 54. When coupled with a 99% reflectivity coating, a net return coupling efficiency of 98% is achievable. The critical tolerances for high pump coupling efficiency include ensuring that the coreless fiber weld joint surface deformation is low and that the coreless fiber tip is welded laterally to a position as close as possible to the center of curvature of the exit facet 88. For the endcap 70, ray tracing shows that the lateral tolerances needed to keep the return loss of the pump light 72 to within 1% of the optimum value are ±5 um for the specific example discussed herein. Also, the weld joint to exit-facet thickness on-axis should be exactly 1 radius of curvature of the exit facet 84. Ray tracing shows the thickness tolerance is about ±20 um accuracy for 1% coupling loss. This tolerance can be achieved by the endcap manufacture, where the stem length is polished down to match the radius of curvature.

The endcap 70 is also configured to control undesired back-reflection of the signal light 74. For a high gain (>20 dB) amplifier it is critical to suppress return loss of the signal light 74 to −60 dB or so to prevent instability. If the delivery fiber 36 was spliced directly to the endcap 70 with perfect alignment, then near 100% of the reflected signal light 74 would be re-imaged back into the core 52. The coating 88 alone can provide only −30 dB or so of suppression. Hence such a geometry would be unworkable. However, splicing in the coreless fiber 86 can prevent re-imaging of the signal light 74 back into the core 52. The signal light 74 is no longer guided in the core 52 after the splice joint between the coreless fiber 86 and the delivery fiber 36, and freely expands along the length of coreless fiber 86. Hence, as shown by the signal light 74, the reflected image of the core 52 off of the facet 84 will be at point 90 within the body 76 of the endcap 70, several millimeters away from the splice joint between the delivery fiber 36 and the coreless fiber 86, thus reducing the amount of reflected signal light 74 that enters the core 52. A simple calculation shows this provides −30 dB of geometric coupling loss into the core 52, which in combination with the −30 dB loss from the coating yields a net return loss of −60 dB, meeting the desired requirement.

Alternatively, a similar −30 dB geometric return loss factor can be achieved by splicing the delivery fiber 36 directly to the endcap 70 with no coreless fiber with a ~10-20 um lateral offset, so that the reflected signal light 74 is re-imaged at an offset from the ~20 um diameter core 52 on the cladding layer 54. In this case, the reflected image of the core 52 is formed directly at the splice joint located at the entrance facet 80, but it is laterally offset by twice the core decentration, so that it couples into the cladding layer 54 rather than the core 52. In this case the pump coupling efficiency will drop by a few percent since it too is re-imaged with a lateral offset, so while this configuration is viable, it may be less advantageous than with the coreless fiber 86.

Typically, applications for fiber amplifiers require low cladding light (typically <1% of the total power). For a notional double-pass pumped fiber amplifier with 95% total (13 dB) pump absorption, the pump power launched at the seed end will be attenuated by 6.5 dB at the endcap 70. The dichroic coating 88 provides an additional −20 dB attenuation, so that the pump power fraction would be no more than −26.5 dB below the signal for the bounding case of a 100% quantum efficiency laser. This is about 0.2% of the output signal light. If this power level is problematic (typically it is not), it can be reduced further by trading coating performance between AR and HR, or by trading back some length of increased gain fiber to reduce further.

The dimensions of the endcap 70 support fiber-to-fiber spacing or pitch in an array of ~4 mm. A smaller pitch may also be of value for SBC. In this case the lateral 4 mm dimension of the exit facet 84 would need to be reduced. This would require reducing the endcap thickness proportionately to prevent clipping of the pump light 72, which would in turn increase the peak intensity of the signal light 74 on the exit facet 84 to levels that could pose a damage risk. However, the signal intensity could be reduced by increasing the length of the coreless fiber 86 to provide additional beam spreading of the signal light 74 on the endcap 70 without affecting pump spreading. The length of the coreless fiber 86 will be limited by signal power clipping on the outer diameter (OD) of the coreless fiber 86 at the end cap weld joint, as described above.

As a concrete example, consider an endcap design based on the endcap 70, but with half the pitch (2 mm instead of 4 mm). For typical LMA Yb doped fibers with a 20 um core diameter, the signal NA is 0.035 in air, corresponding to a half-angle divergence of 25 mrad in $SiO_2$. If the system 10 is designed to clip on a 400 um OD coreless fiber at 4*beam radii, then the length of the coreless fiber 86 can be 400 um/(4*25 mrad)=4 mm without significant clipping. The thickness of the endcap 70 would also be 4 mm for a total signal beam expansion length of 8 mm.

Figure 5:
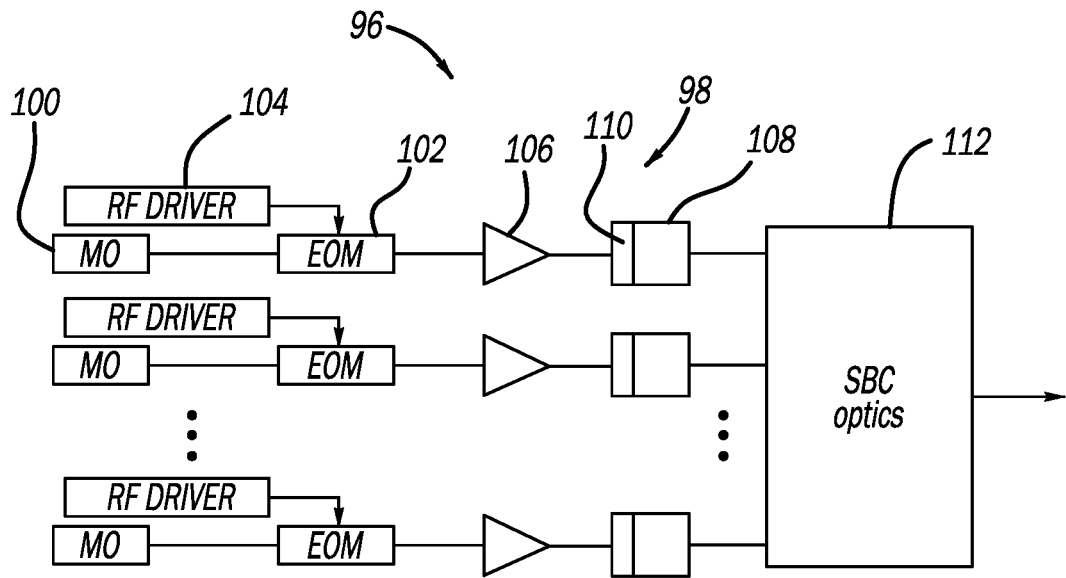
FIG. 5 is a schematic block diagram of an SBC fiber laser amplifier system including the double-pass pump architecture.

FIG. 5 is a simplified block diagram of an SBC fiber laser amplifier system 96 that includes a plurality of amplification channels 98 each having an MO 100 that generates a signal beam, where the MOs 100 in the different channels 98 generate the signal beams at different wavelengths. The signal beam is sent to an EOM 102 that receives an applied voltage provided by an RF driver 104 that provides frequency modulation broadening. The signal beam is then amplified by a fiber amplifier 106 and the amplified signal beam is sent to a beam launcher 108 having an endcap 110 of the type discussed above. The endcap 110 would be configured to accommodate the fibers in all of the channels 98 and may be configured so that many of the endcaps 70 are bonded together. Alternatively, a flat input surface of a monolithic microlens array may be bonded to a flat output surface of a multi-fiber endcap array, so as to configure a multi-faceted endcap array suitable for welding multiple fibers. The amplified beam is then sent through free space to SBC combining optics 112 including a grating (not shown) that has a periodic structure formed into the grating so that when the individual amplified beams each having a slightly different wavelength and angular direction are redirected by the periodic structure so that all of the beams diffract from the diffraction grating in the same direction as a combined output beam.

Figure 6:
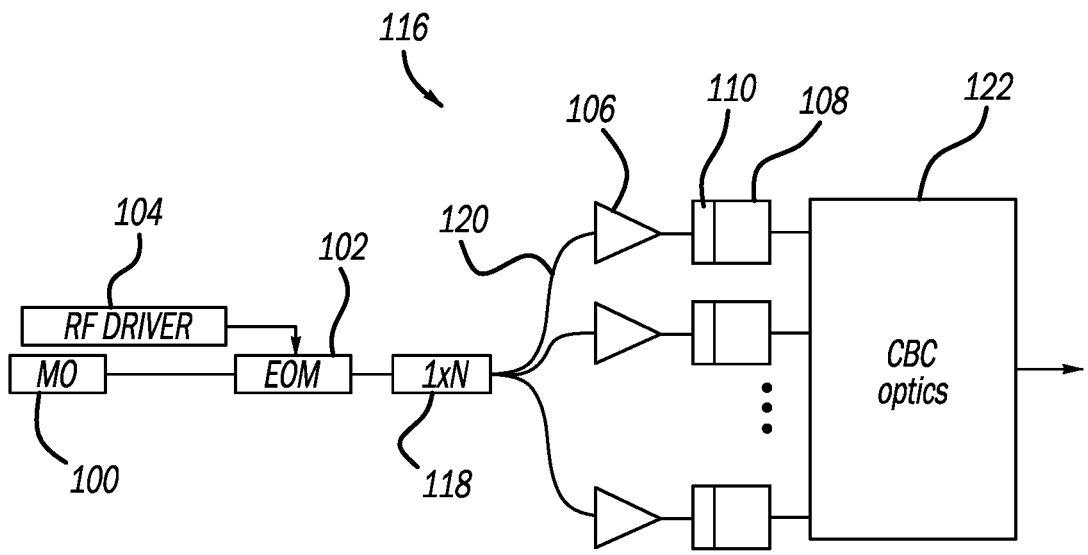
FIG. 6 is a schematic block diagram of a CBC fiber laser amplifier system including the double-pass pump architecture.

FIG. 6 is a simplified block diagram of a CBC fiber laser amplifier system 116 where like elements to the system 96 are identified by the same reference number. The system 116 includes a single MO 100 that generates a signal beam that is split by a beam splitter 118 into multiple signal beams that are amplified by the amplifiers 106. The amplified beams from the beam launchers 108 are sent to CBC optics 122 that combine all of the amplified beams into a combined output beam.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A fiber laser amplifier system comprising:
   at least one signal beam source generating a signal beam;
   at least one pump beam source generating a pump beam;
   a beam combiner for combining the signal beam and the pump beam;
   a first dual-clad delivery fiber coupled to the beam combiner and receiving the combined pump beam and signal beam;
   a doped amplifying fiber coupled to the first delivery fiber and receiving the combined pump beam and signal beam, said amplifying fiber amplifying the signal beam using the pump beam;
   a second dual-clad delivery fiber coupled to the amplifying fiber and receiving the amplified signal beam and the pump beam; and
   an endcap including an input facet and an output facet, said input facet being coupled to the second delivery fiber and receiving the amplified signal beam and the pump beam, said output facet being configured to pass the amplified signal beam and reflect the pump beam back onto the second delivery fiber to be directed back to the doped amplifying fiber.

2. The system according to claim 1 wherein the output facet includes a dichroic coating that is antireflective at the wavelength of the signal beam and highly reflective at the wavelength of the pump beam.

3. The system according to claim 1 wherein the output facet is spherically curved.

4. The system according to claim 1 wherein the second delivery fiber is directly welded to the input facet.

5. The system according to claim 1 further comprising a coreless fiber coupled between the second delivery fiber and the input facet.

6. The system according to claim 1 wherein the endcap is configured so that the pump beam reflected by the output facet is re-imaged on a cladding layer of the second delivery fiber.

7. The system according to claim 1 wherein the endcap is configured so that any signal light that is reflected by the output facet is re-imaged on a cladding layer offset from the core of the second delivery fiber.

8. The system according to claim 1 wherein the endcap includes a tapered portion proximate the input facet and a straight portion proximate the output facet.

9. The system according to claim 1 wherein the endcap is about 8 mm long and about 4 mm wide.

10. The system according to claim 1 wherein the beam combiner is a taper fiber bundle.

11. The system according to claim 1 wherein the at least one pump source is a plurality of pump sources.

12. The system according to claim 1 wherein the fiber laser amplifier system is a coherent beam combining (CBC) fiber laser amplifier system and the at least one pump beam source, the beam combiner, the first delivery fiber, the doped amplifying fiber and the second delivery fiber are part of one fiber channel of a plurality of fiber channels.

13. The system according to claim 1 wherein the fiber laser amplifier system is a spectral beam combining (SBC) fiber laser amplifier system and the at least one pump beam source, the beam combiner, the first delivery fiber, the doped amplifying fiber and the second delivery fiber are part of one fiber channel of a plurality of fiber channels.

14. A fiber laser amplifier system comprising:
    at least one signal beam source generating a signal beam;
    at least one pump beam source generating a pump beam;
    a beam combiner for combining the signal beam and the pump beam;
    a first dual-clad delivery fiber coupled to the beam combiner and receiving the combined pump beam and signal beam;
    a doped amplifying fiber coupled to the first delivery fiber and receiving the combined pump beam and signal beam, said amplifying fiber amplifying the signal beam using the pump beam;
    a second dual-clad delivery fiber coupled to the amplifying fiber and receiving the amplified signal beam and the pump beam;
    a coreless fiber coupled to the second delivery fiber and receiving the amplified signal beam and the pump beam; and
    an endcap including an input facet and an output facet, said input facet being coupled to the coreless fiber and receiving the amplified signal beam and the pump beam, said output facet being spherically curved and including a dichroic coating so as to pass the amplified signal beam and reflect the pump beam back onto the coreless fiber to be directed back to the second delivery fiber and the doped amplifying fiber, wherein the reflected pump beam is re-imaged onto a cladding layer of the coreless fiber and any signal light that is reflected from the output facet is re-imaged in the endcap.

15. The system according to claim 14 wherein the endcap includes a tapered portion proximate the input facet and a straight portion proximate the output facet.

16. The system according to claim 14 wherein the endcap is about 8 mm long and about 4 mm wide.

17. The system according to claim 14 wherein the fiber laser amplifier system is a coherent beam combining (CBC) fiber laser amplifier system and the at least one pump beam source, the beam combiner, the first delivery fiber, the doped amplifying fiber and the second delivery fiber are part of one fiber channel of a plurality of fiber channels.

18. The system according to claim 14 wherein the fiber laser amplifier system is a spectral beam combining (SBC) fiber laser amplifier system and the at least one pump beam source, the beam combiner, the first delivery fiber, the doped amplifying fiber and the second delivery fiber are part of one fiber channel of a plurality of fiber channels.

19. An optical endcap including an input facet and an output facet, said input facet being coupled to a dual-clad delivery fiber and receiving an amplified signal beam and a pump beam, said output facet being configured to pass the amplified signal beam and reflect the pump beam back onto the delivery fiber to be directed back to a doped amplifying fiber.

20. The endcap according to claim 19 wherein the output facet is spherically curved and includes a dichroic coating that is antireflective at the wavelength of the signal beam and highly reflective at the wavelength of the pump beam.

* * * * *